April 3, 1951 J. H. BOWERS 2,547,253
HOLDER AND DISPENSER FOR ROLLED FLEXIBLE STRANDS
Filed Feb. 3, 1950
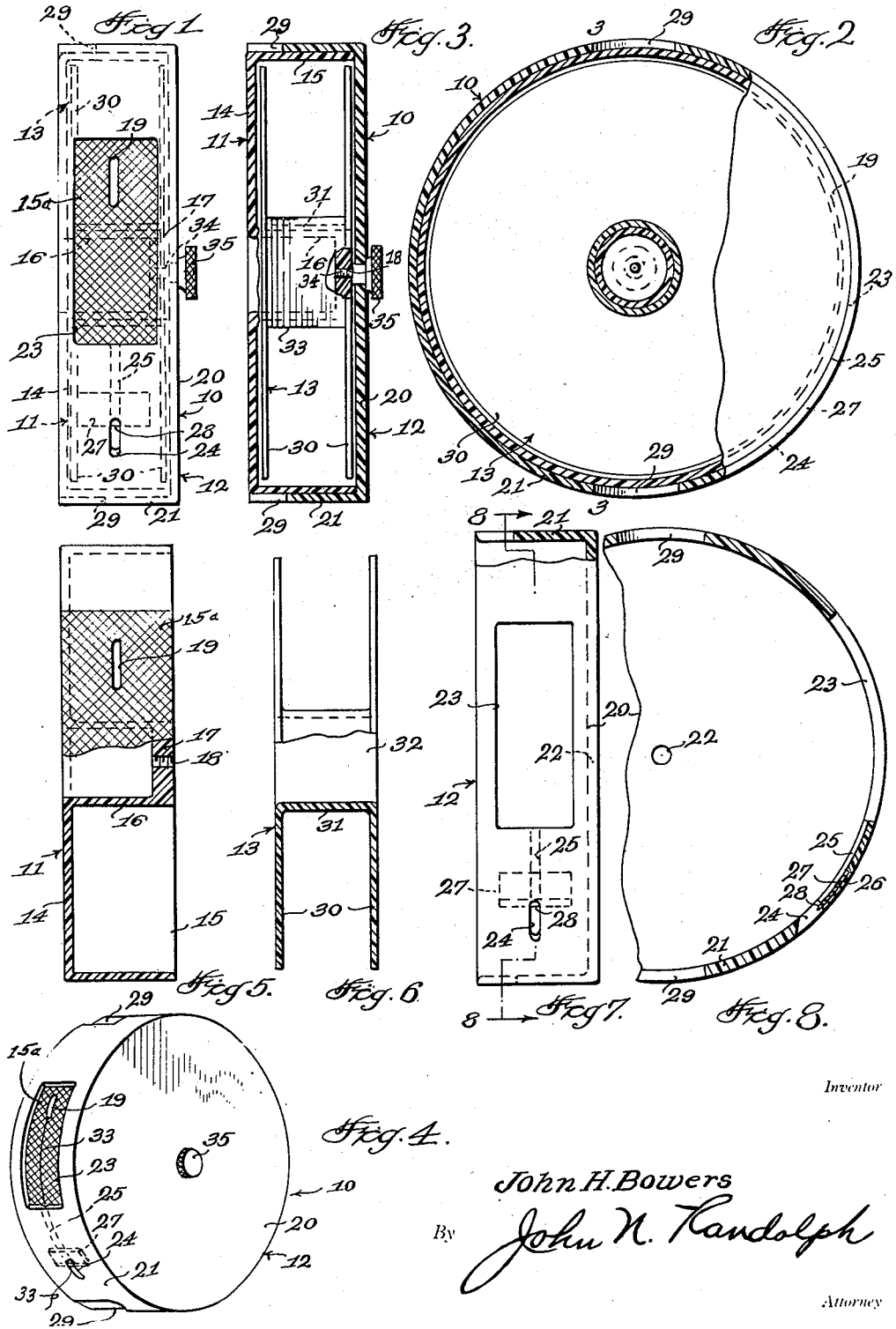
Inventor
John H. Bowers
By John N. Randolph
Attorney Patented Apr. 3, 1951

2,547,253

UNITED STATES PATENT OFFICE 2,547,253

HOLDER AND DISPENSER FOR ROLLED FLEXIBLE STRANDS

John H. Bowers, Willow Run, Mich.

Application February 3, 1950, Serial No. 142,235

3 Claims. (Cl. 242—135)

This invention relates to a novel holder and dispenser particularly adapted for containing and dispensing a roll of fishing line leader such as gut, nylon or steel and which will effectively function to retain the leader in a neat, orderly and readily accessible manner and eliminate the time consuming tangles caused by a loose roll of leader.

Still a further object of the invention is to provide a holder and dispenser from which any desired amount of the flexible strand or leader may be dispensed and cut off and the remainder retained by the holder in a readily accessible manner for use when required.

Still a further object of the invention is to provide a holder and dispenser which may be readily refilled and reused and which may be constructed in a size convenient to be carried in a fishing tackle box yet which will hold a relatively large amount of leader.

Various other objects and advantages of the invention will hereinafter become more fully apparent from the following description of the drawing, illustrating a presently preferred embodiment thereof, and wherein:

Figure 1 is an edge elevational view showing the holder and dispenser in an assembled position;

Figure 2 is a side elevational view thereof partly in section looking from left to right of Figure 1.

Figure 3 is a diametrical sectional view of the device taken substantially along a plane as indicated by the line 3—3 of Figure 2;

Figure 4 is a perspective view on a reduced scale of the holder and dispenser showing a portion of a flexible strand being dispensed therefrom;

Figure 5 is an edge elevational view, partly in diametrical section showing the inner section of the container;

Figure 6 is a view similar to Figure 5 showing the spool of the holder;

Figure 7 is a view similar to Figures 5 and 6 showing the outer section of the container, and Figure 8 is a fragmentary sectional view of the outer container taken substantially along a plane as indicated by the line 8—8 of Figure 7.

Referring more specifically to the drawing, the holder and dispenser, designated generally 10 and comprising the invention will be described for use in connection with a roll of fishing leader but it will be readily apparent that the device 10 is equally well adapted for use as a holder and dispenser for other types of flexible strands. The holder and dispenser 10 includes an inner container section, designated generally 11, and illustrated in detail in Figure 5; an outer container section, designated generally 12, and illustrated in detail in Figure 7, and a spool, designated generally 13, and illustrated in detail in Figure 6.

The inner container section 11 includes a side wall 14 of circular shape having an annular flange 15 projecting from one side thereof and which is disposed at a right angle to the wall 14. The wall 14 is provided with a central depression forming a hub 16 of circular cross section which is disposed concentrically within the annular flange 15 and which has an end wall 17, the outer surface of which is preferably disposed flush with the free edge of the flange 15, as clearly illustrated in Figure 5. Said end wall 17 of the hub 16 is provided with a central threaded opening 18. A portion of the flange 15 is provided with a circumferentially elongated slot 19, for a purpose which will hereinafter be described.

The outer container section 12 comprises a side wall 20 and an annular flange 21 which projects from the periphery of the wall 20 and which is disposed substantially at a right angle to the plane of the wall 20. The wall 20, which is likewise circular, is provided with a central opening 22 which is larger in diameter than the threaded opening 18. The flange 21 is provided with an elongated, relatively wide opening 23 which extends circumferentially thereof and a substantially smaller circumferentially extending slot 24 which is of approximately the same size as the slot 19. The slot 24 is circumferentially spaced from the opening 23 and the inner side of the flange 21 is provided with a circumferentially extending inwardly opening groove 25 which extends between the adjacent ends of the opening 23 and slot 24. The inner surface of the flange 21 is also recessed transversely as seen at 26 in Figure 8 to accommodate a small blade 27 which is suitably secured therein and which has a cutting edge 28 which extends into the end of the slot 24 which is disposed adjacent the opening 23. The groove 25 extends across the blade 27 so that a portion of said blade forms a part of the bed of the groove 25. The flange 21 is also provided with two diametrically opposed substantially semicircular recesses 29 which open outwardly of the free edge of said flange 21. The opening 23 and slot 24 are located between said recesses 29, as best illustrated in Figure. 8.

The spool 13 comprises corresponding spaced sides 30 which are circular in outline and joined by an integral transversely extending cylindrical hub 31 which extends therebetween and which defines a bore 32 of circular cross section sized to fit detachably and rotatably on the hub 16.

The spool 13 is adapted to have a roll of fishing leader 33 wound thereon and which may be initially of a sufficient length to fill the spool 13. The outer end of the leader 33 is first passed outwardly through the slot 19, after which the spool 13 is positioned in the inner container section 11 with its hub 31 journaled on the hub 16. The protruding end of the leader 33 is then passed outwardly through the slot 24 and a portion thereof is positioned in the groove 25. The outer container 12, which is sufficiently larger than the inner container 11 to engage thereover, is then applied over the inner container 11 so that the slot 19 will be disposed adjacent the end of the opening 23 which is located remote to the slot 24 or said slot 19 may be disposed beneath a portion of the flange 21, beyond and adjacent the end of the opening 23 which is remote to the slot 24, so that a portion of the leader 33 will be exposed by the opening 23 between the groove 25 and the slot 19, as illustrated in Figure 4.

A screw 34, having an enlarged knurled head 35, is then inserted through the opening 22 and is threadedly engaged in the opening 18 and tightened for securing the container sections 11 and 12 together and for clamping the central portion of the wall 20 against the hub end 17 to prevent the container sections 11 and 12 from turning relatively to one another. As seen in Figure 3, the spool 13 is sized so as to be loosely disposed within the flange 15 and between the container walls 14 and 20 to allow the spool to turn freely on the hub 16 as the leader or strand 23 is withdrawn therefrom. The outer surface of the flange 15 is roughened or knurled as seen at 15a so that a portion of the strand will be gripped between said roughened surface and the bed of the groove 25 to prevent the strand 33 from slipping back out of the groove 25 into the opening 23. The user may grasp the holder 10 in either hand and by applying the thumb of the hand which grips the holder 10 through the opening 23 can engage the portion of the strand 33 which extends longitudinally of said opening 23 for pushing it toward the groove 25 for withdrawing a portion of the strand from the spool 13 through the opening 19 and for sliding the strand through the groove 25 and outwardly of the flange 21 through the slot 24. When a sufficient amount of the strand has thus been projected through the slot 24 it may be gripped between the fingers and a pull exerted thereon in a direction along the outer side of the flange 21 and away from the blade 27 until the desired amount of the strand or leader 33 has been exposed beyond the slot 24. By then pulling the exposed end outwardly and toward the opening 23, the strand 33 will be cut off by the cutting edge 28 and the strand remaining adjacent the slot 24 will be held by engagement of the adjacent strand portion between the knurled surface 15a and the groove 25 until additional leader is desired and which may be obtained in the same manner, as just previously described, by initially drawing the strand from the spool by pressing the thumb on the strand 33 through the opening 23 and for ejecting the outer end of the strand outwardly through the slot 24. After the strand 31 has been used up, the screw 34 is removed and by gripping the flange 15 through the recesses 29 with one hand and the flange 21 with the other hand, the sections 11 and 12 may be disconnected after which the spool 13 is removed from the section 11 to be refilled or replaced with a filled spool. The holder 10 may then be reassembled, as previously described for reuse.

The container sections 11 and 12 are preferably formed of plastic which may or may not be transparent but may be formed of any other suitable material. The spool 13 is preferably formed of a light weight metal but may be formed of a material corresponding to the container sections 11 and 12. The holder 10 may be made in various sizes and various other modifications and changes are likewise contemplated and may obviously be resorted to, without departing from the spirit or scope of the invention as hereinafter defined by the appended claims.

I claim as my invention:

1. A holder and dispenser for a flexible, non-limber rolled strand, comprising an inner container section, an outer container section and a spool, said inner and outer container sections each including a substantially circular side wall having an annular flange projecting from one side thereof, said inner container section having a centrally disposed hub portion disposed centrally of the inner container section flange, said spool having a central hub provided with a bore rotatably and detachably engaging the hub portion of the inner container section and journaled thereby detachably in the inner container section, said spool being adapted to contain a rolled flexible strand to be dispensed from the holder, said outer container section being larger in diameter than the inner container section to fit thereover and with the container section flanges overlapping, fastening means detachably connecting the container sections at the centers thereof, the flange of said inner container section having a circumferentially elongated slot through which the outer end portion of the flexible strand loosely extends outwardly of the holder, and said outer container section flange having a circumferentially elongated slot circumferentially spaced from the slot of the inner container section through which the end portion of said strand end extends outwardly of the holder whereby a portion of the flexible strand is disposed circumferentially of the holder and between said flanges, said outer container section flange having a recessed inner side portion, a blade secured in said recess of the outer container section flange and having a cutting edge extending across the slot of said outer container flange and adjacent the end of said slot located nearest the slot of the inner container section flange.

2. A holder and dispenser for a flexible, non-limber rolled strand, comprising an inner container section, an outer container section and a spool, said inner and outer container section each including a substantially circular side wall having an annular flange projecting from one side thereof, said inner container section having a centrally disposed hub portion disposed centrally of the inner container section flange, said spool having a central hub provided with a bore rotatably and detachably engaging the hub portion of the inner container section and journaled thereby detachably in the inner container section, said spool being adapted to contain a rolled flexible strand to be dispensed from the holder, said outer container section being larger in diameter than the inner container section to fit thereover and with the container section flanges overlapping, fastening means detachably connecting the container sections at the centers thereof, the flange of said inner container section having a circumferentially elongated slot through which the outer end portion of the flexible strand loosely extends outwardly of the holder, and said outer container section flange having a circumferentially elongated slot circumferentially spaced from the slot of the inner container section through which the end portion of said strand end extends outwardly of the holder whereby a portion of the flexible strand is disposed circumferentially of the holder and between said flanges, said outer flange having a circumferentially extending groove in its inner side disposed between said slots and through which a portion of the flexible strand extends, the inner flange being knurled on its outer side to cooperate with said groove for gripping the flexible strand, and a cutting blade secured to the outer flange and disposed between said flanges and having a cutting edge extending across an end of the slot of the outer flange for cutting off the flexible strand in desired lengths.

3. A holder and dispenser for a flexible, nonlimber rolled strand, comprising an inner container section, an outer container section and a spool, said inner and outer container sections each including a substantially circular side wall having an annular flange projecting from one side thereof, said inner container section having a centrally disposed hub portion disposed centrally of the inner container section flange, said spool having a central hub provided with a bore rotatably and detachably engaging the hub portion of the inner container section and journaled thereby detachably in the inner container section, said spool being adapted to contain a rolled flexible strand to be dispensed from the holder, said outer container section being larger in diameter than the inner container section to fit thereover and with the container section flanges overlapping, fastening means detachably connecting the container sections at the centers thereof, the flange of said inner container section having a circumferentially elongated slot through which the outer end portion of the flexible strand loosely extends outwardly of the holder, and said outer container section flange having a circumferentially elongated slot circumferentially spaced from the slot of the inner container section through which the end portion of said strand end extends outwardly of the holder whereby a portion of the flexible strand is disposed circumferentially of the holder and between said flanges, a blade secured in the outer container section flange between the inner and outer surfaces of said flange, said blade having a cutting edge extending across the slot of the outer container section flange and disposed to face away from the slot of the inner container section flange.

JOHN H. BOWERS.

REFERENCES CITED

The following references are of record in the file of this patent:

UNITED STATES PATENTS

| Number | Name | Date |
| --- | --- | --- |
| 159,168 | Ellis | Jan. 26, 1875 |
| 2,107,603 | Ellenburg | Feb. 8, 1938 |
| 2,201,305 | Springer | May 21, 1940 |

FOREIGN PATENTS

| Number | Country | Date |
| --- | --- | --- |
| 287,667 | Great Britain | Mar. 29, 1928 |